United States Patent Office 3,379,716
Patented Apr. 23, 1968

3,379,716
AROMATIC MONOAZO DYESTUFFS
David J. Wallace and Max A. Weaver, Kingsport, Tenn., assignors to Eastman Kodak Company, Rochester, N.Y., a corporation of New Jersey
No Drawing. Filed June 16, 1965, Ser. No. 464,547
10 Claims. (Cl. 260—207.1)

ABSTRACT OF THE DISCLOSURE

Phenyl-azo-aniline compounds having a di(acyl)amidoalkyl group attached to the aniline nitrogen atom are useful as dyes for hydrophobic textile materials.

This invention relates to azo compounds particularly useful as dyes for textile fibers, yarns and fabrics. More particularly this invention relates to azo compounds of the general formula I
$$R-N=N=R_1-N-R_3-N\begin{matrix}X\\Y\end{matrix}$$
$$\phantom{R-N=N=R_1-}|\phantom{R_3}$$
$$\phantom{R-N=N=R_1-}R_2$$

wherein:

R represents a monocyclic aromatic radical of the benzene series derived from diazotized aniline such as unsubstituted phenyl or substituted phenyl e.g. 2-amino-5-nitrophenylmethyl sulfone and other anilines described in the examples below. The mentioned aromatic radical R derived from an aniline compound thus includes unsubstituted phenyl and substituted phenyl such as:

alkylphenyl, e.g., o,m,p-tolyl,
alkoxyphenyl, e.g., o,m,p-methoxyphenyl,
halophenyl, e.g., o,m,p-chlorophenyl,
nitrophenyl, e.g., o,m,p-nitrophenyl,
alkylsulfonylphenyl, e.g., o,m,p-methylsulfonylphenyl,
alkylsulfonamidophenyl, e.g., o,m,p-methylsulfonamidophenyl,
di(alkylsulfonyl)phenyl, e.g., 2,5-di(methylsulfonyl)-phenyl,
dicarboxylicacidimidophenyl, e.g., o,m-succinimidophenyl,
fluoroalkylphenyl, e.g., trifluoromethylphenyl,
acylamidophenyl, e.g., o,m,p-acetamidophenyl,
cyanophenyl, e.g., o,m,p-cyanophenyl,
carboxamidophenyl, e.g., o,m,p-carboxamidophenyl,
benzamidophenyl,
thiocyanophenyl, e.g., o,m,p-thiocyanophenyl,
alkylthiophenyl, e.g., o,m,p-methylthiophenyl,
benzoxyphenyl, e.g., o,m,p-benzoxyphenyl,
benzaminophenyl, e.g., o,m,p-benzaminophenyl,
benzylaminophenyl, e.g., o,m,p-benzylaminophenyl,
N-alkylbenzaminophenyl, e.g., N-phenylmethylaminophenyl,
formylphenyl, e.g., o,m,p-formylphenyl,
carbalkoxyphenyl, e.g., o,m,p-carbethoxyphenyl, and
benzoylphenyl, e.g., o,m,p-benzoylphenyl $R_1$ represents a monocyclic aromatic radical of the benzene series including unsubstituted phenylene e.g. p-phenylene and substituted phenylene e.g. such as alkylphenylene, e.g. m-tolylene

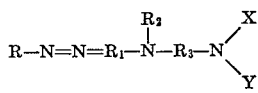

o-tolylene; alkoxphenylene, e.g. 3-methoxyphenylene

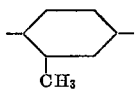

2,5-dimethoxyphenylene; acylamidophenylene, e.g. 3-acetamidophenylene; halophenylene, e.g. 3-chlorophenylene. Radicals represented by $R_1$ can therefore include phenylene, alkylphenyl, e.g., o,m-tolylene, alkoxyphenylene, e.g., o,m-methoxyphenylene, halophenylene, e.g., o,m-chlorophenylene, alkylsulfonylphenylene, e.g., o,m-methylsulfonylphenylene, alkylsulfonamidophenylene, e.g., o,m-methylsulfonamidophenylene, di(alkylsulfonyl)-phenylene, e.g., 2,5-di(methylsulfonyl)phenylene, dicarboxylicacidimidophenylene, e.g., o,m-succinimidophenylene, acylamidophenylene, e.g., o,m-acetamidophenylene, benzamidophenylene, thiocyanophenylene, e.g., o,m-thiocyanophenylene, alkylthiophenylene, e.g., o,m-methylthiophenylene, benzoxyphenylene, e.g., o,m-benzoxyphenylene, benzaminophenylene, e.g., o,m-benzaminophenylene, benzylaminophenylene, e.g., o,m-benzylaminophenylene, N-alkylbenzaminophenylene, e.g., o,m - N - phenylmethylaminophenylene, carbalkoxyphenylene, e.g., o,m-carbethoxyphenylene and benzoylphenylene, e.g., o,m benozylphenylene.

$R_2$ represents hydrogen or an alkyl radical preferably lower alkyl i.e. from 1 to 4 carbon atoms, being unsubstituted or substituted such as hydroxyalkyl, e.g. hydroxyethyl; alkoxyalkyl, e.g. methoxyethyl; cyanoalkyl, e.g. cyanoethyl; acyloxyalkyl, e.g. acetoxyethyl; carboalkoxyalkyl, e.g. carbethoxyethyl; halogenoalkyl, e.g. chloroethyl; alkylsulfonylalkyl, e.g. methyl sulfonylethyl; carboxamidoalkyl, e.g. carboxamidoethyl, etc. or $R_2$ represents a monocyic aromatic radical of the benzene series such as unsubstituted phenyl and substituted phenyl such as the alkylphenyl, alkoxyphenyl and other substituted phenyl groups give above.

$R_3$ represents a lower alkylene group i.e. a straight or branched chain of from 1 to 4 C atoms, and X and Y represent the same or different acyl groups, such as, alkanoyl; e.g. propinoyl; aroyl, e.g. benzoyl; alkoxyacyl, e.g. ethoxy; carbonyl; carbamoyl; e.g. phenyl carbamoyl; etc. or; sulfonyl groups such as, alkylsulfonyl, e.g. methylsulfonyl; arysulfonyl, e.g. phenylsulfonyl; etc.

The azo compounds of this invention are prepared by diazotization of the aniline or aniline derivatives described above and coupling the diazotized products with the coupler of general formula II
$$H-R_1-N-R_3-N\begin{matrix}X\\Y\end{matrix}$$
$$\phantom{H-R_1-}|\phantom{R_3}$$
$$\phantom{H-R_1-}R_2$$

wherein $R_1$, $R_2$, $R_3$, X and Y have the meanings give above.

Particularly useful compounds of this invention are of the three general formulas:

III 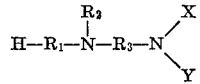

IV 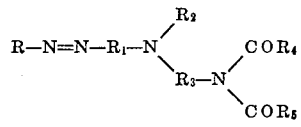

V. 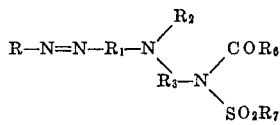

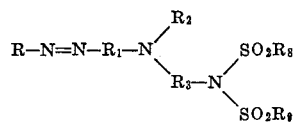

$R_4$ and $R_5$=a lower alkyl radical, a lower alkoxy radical or a monocyclic aromatic radical of the benzene series, $R_6$ and $R_7$=a lower alkyl radical or a monocyclic aromatic radical of the benzene series, and $R_8$ and $R_9$=a lower alkyl radical or a monocyclic aromatic radical of the benzene series.

The specific alkyl radicals and monocyclic aromatic radicals given above are also exemplary of the $R_4$–$R_9$ group.

The groups X and Y differentiate these compounds from prior art compounds and favorably affect the dye characteristics such as light fastness and resistance to sublimation, especially when the compounds are used for dyeing textile materials. The substituents attached to benzene radical R or to $R_1$–$R_9$ are not critical and serve primarily as auxochromes to control the color of the azo compound.

The coupling components having the above Formula II are prepared in the following manner:

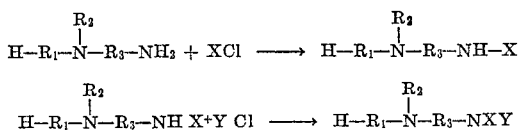

wherein $R_1$, $R_2$, $R_3$, X and Y are as defined above. These reactions result in compounds in which the newly substituted amines are diacyl substituted, disulphonyl substituted or acylsulphonyl substituted depending on the reactants chosen. A more detailed description of the coupler synthesis appears in preparative examples of co-pending application Ser. No. 458,417, filed May 24, 1965.

The resultant azo compounds can be used for dyeing textile materials including synthetic polymer fibers, yarns and fabrics giving a variety of fast shades including blue, yellow, red and brown when applied thereto by conventional dyeing methods. The compounds have moderate affinity for cellulose ester and polyamide fibers. When the azo compounds are used for dyeing such hydrophobic materials, they should be free of water-solubilizing groups such as sulfo and carboxyl. In general, the dyes have good fastness, for example, to light, washing, gas (atmospheric fumes) and sublimation.

The following examples will serve to illustrate the preparation of representative azo compounds of our invention. All of the couplers used were prepared in the manner described in co-pending application Ser. No. 458,417, filed May 24, 1965.

EXAMPLES OF THE DYES

Example 1

A. Diazotization.—6.9 g. (0.05 m.) p-nitroaniline was dissolvde in 5.4 ml. conc. sulfuric acid and 12.6 ml. water. This solution was poured onto 50 g. of ice and then a solution of 3.6 g. sodium nitrite in 8 ml. water was rapidly added. The diazotization reaction mixture was stirred at 5° C. for one hour.

B. Coupling.—The cold diazonium solution from 1A was filtered and then added to a chilled solution of 16.7 g. (0.05 m.) of N-[2-(N'-ethyl-m-toluidino)ethyl] dimethanesulfonamide in 250 cc. dilute sufuric acid. This coupling mixture was kept at 0–3° C. and neutralized to Congo red paper with solid ammonium acetate. After coupling 2 hrs. at ice-bath temperature the mixture was drowned in water, filtered, washed with water, and dried at room temperature. The product dyed polyester fibers in orange shades of excellent fastness properties. The dye has the structure:

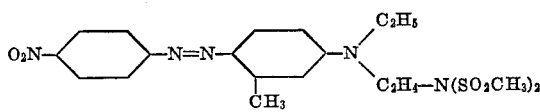

Example 2

A. Diazotization.—A solution of 3.6 g. dry sodium nitrite in 25 cc. conc. sulfuric acid was cooled in an ice-bath, and 50 cc. 1:5 acid (1 part propionic:5 parts acetic) was added, while the temperature was maintained below 15° C. This solution was stirred at 5° C. and 8.6 g. (0.05 m.) 2-chloro-4-nitroaniline was added. An additional 50 cc. of 1:5 acid was added and the diazotization reaction mixture was stirred 2 hrs. at 0–5° C.

B. Coupling.—16.7 g. (0.05 m.) N-[2-(N'-ethyl-m-toluidino)ethyl] dimethanesulfonamide was dissolved in 250 cc. didute sulfuric acid. To the chilled solution was added the cold diazotization solution from 2A, while the temperature was maintained at about 5° C. The coupling solution stirred at 5° C. and neutralized to Congo red paper with solid ammonium acetate. After coupling 2 hrs. the mixture was drowned in water, filtered, washed with water and dried at room temperature. The product dyes polyester fibers a deep red shade with outstanding light and sublimation fastness.

Example 3

A. Diazotization.—9.3 (0.1 m.) of aniline was dissolved in 150 cc. water containing 30 cc. conc. HCl. Ice was added followed by a solution of 7.2 g. of sodium nitrite in 25 cc. water. The solution was stirred 15 min.

B. Coupling.—The reaction mixture from 3A was cooled and added a cold solution of 33.4 g. (0.1 m.) of N-[2-(N'-ethyl-m-toluidino)ethyl] dimethanesulfonamide. The coupling solution was maintained below 5° C. while it was neutralized to litmus with sodium bicarbonate. After chilling for two hours the mixture was drowned in water, filtered, washed with water, and dried at room temperature. The product dyed polyester and cellulose acetate fibers yellow shades of good fastness properties.

Examples 4

A. Diazotization.—A solution of 3.6 g. dry sodium nitrite in 25 cc. conc. sulfuric acid was cooled in an ice-bath, and 50 cc. 1:5 acid was added, while the temperature was maintained below 15° C. This solution was stirred at 5° C. and 10.4 g. 2,6-dihloro-4-nitroaniline was added. An additional 50 cc. of 1:5 acid was added and the diazotization reaction mixture was stirred 2 hrs. at 0–5° C.

B. Coupling.—16.7 g. (0.05 m.) N-[2-(N'-ethyl-m-toluidino)-ethyl] dimethanesulfonamide was dissolved in 250 cc. dilute sulfuric acid. To the chilled solution was added the cold diazotization solution from 4A, while the temperature was maintained at about 5° C. The coupling solution stirred at 5° C. and neutralized to Congo red paper with solid ammonium acetate. After coupling 2 hrs. the mixture was drowned in water, filtered, washed m-toluidino)-ethyl] methanesulfonamide. The product dyes polyester fibers brown shades of excellent fastness.

Example 5

The procedure of Example 4 was carried out except using as the coupler (0.05 m.) N-acetyl-N-[2-(N'-ethyl-m-toluidino) ethyl] methanesulfonamide. The product dyed polyester fibers brown shades of excellent fastness. The dye has the following formula:

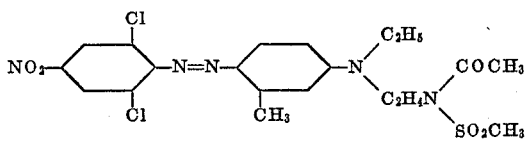

Example 6

A. Diazotization.—13.5 g. (0.10 m.) p-aminoacetophenone was dissolved in 150 cc. water containing 30 cc. conc. HCl. Ice was added followed by a solution of 7.2 g. $NaNO_2$ in 25 cc. water. The solution was stirred 15 minutes.

B. Coupling.—The diazotization reaction mixture from Example 6A was poured into an iced solution of 29.8 g. (0.10 m.) N - acetyl-N[2-(N'-ethyl-m-toluidino)-ethyl]

methanesulfonamide in 250 cc. dil. HCl. The coupling solution was neutralized to litmus with sodium bicarbonate and the chilled mixture was allowed to react for 2 hrs. The product was filtered off, washed with water, and dried. The product dyes polyester and nylon fibers a reddish yellow shade of excellent fastness properties.

Example 7

The procedure of Example 1 was carried out except for the diazonium component 10.8 g. 2-amino-5-nitrophenylmethylsulfone. The product dyed polyester fibers a deep red of excellent fastness properties.

The azo compounds of the following table having Formula I above are prepared in the manner described in Examples 1 to 8 by coupling the appropriate diazotized aniline with the appropriate coupler of Formula II.

for example, by incorporating the azo compounds into the spinning dope and spinning the fiber as usual. The azo compounds of our invention have varying utility as dyes. The degree of utility varies, for example, depending upon the material being dyed and the formula of the azo compound. Thus, for example, all the dyes will not have the same degree of utility for the same material.

By cellulose aliphatic carboxylic acid esters having 2 to 4 carbon atoms in the acid groups thereof, we mean to include, for example, both partially hydrolyzed and unhydrolyzed cellulose acetate, cellulose propionate and cellulose acetate butyrate.

Polymeric linear polyester materials of the terephthalate type are illustrative of the linear aromatic polyester textile materials that can be dyed with the new azo compounds of our invention. The terephthalate fibers sold

| Ex. No. | Substituents on R | Substituents on $R_1$ | $R_2$ | $R_3$ | X | Y | Coloring of Polyester Dyeings |
|---|---|---|---|---|---|---|---|
| 8 | 2-Cl-4-$NO_2$ | 3-$CH_3$ | —$C_3H_7$ | —$CH_2CH_2$— | —$SO_2CH_3$ | —$SO_2CH_3$ | Red. |
| 9 | 2-Cl-4-$NO_2$ | None | $C_2H_5$ | —$CH_2CH_2$— | —$SO_2CH_3$ | —$SO_2CH_3$ | Red. |
| 10 | 2-Cl-4-$NO_2$ | 3-$CH_3$ | $C_6H_5$ | —$CH_2CH_2$— | —$SO_2CH_3$ | —$COCH_3$ | Red. |
| 11 | 2-Cl-4-$NO_2$ | 3-$CH_3$ | $C_2H_5$ | —$CH_2CH_2$— | —$COCH_3$ | —$COCH_3$ | Red. |
| 12 | 2-Cl-4-$NO_2$ | 3-$CH_3$ | $C_2H_5$ | —$CH_2CH_2$— | —$SO_2CH_3$ | —$COC_6H_5$ | Red. |
| 13 | 2-Cl-4-$NO_2$ | 3-$CH_3$ | $C_2H_5$ | —$CH_2CH_2$— | —$SO_2CH_3$ | —$COC_2H_5$ | Red. |
| 14 | 2-Cl-4-$NO_2$ | 3-$CH_3$ | $C_2H_5$ | —$CH_2CH_2$— | —$SO_2CH_3$ | —$CO_2C_2H_5$ | Red. |
| 15 | 2-Cl-4-$NO_2$ | 3-$CH_3$ | $C_2H_5$ | —$CH_2CH_2$— | —$SO_2CH_3$ | —$SO_2C_6H_5$ | Red. |
| 16 | 2-Cl-4-$NO_2$ | 3-$CH_3$ | $C_2H_5$ | —$CH_2CH_2$— | —$COC_6H_5$ | —$COC_6H_5$ | Red. |
| 17 | 2-Cl-4-$NO_2$ | 3-$CH_3$ | $C_2H_5$ | —$CH_2CH_2$— | —$SO_2CH_3$ | —$COCH_3$ | Red. |
| 18 | 2-Cl-4-$NO_2$ | 3-$CH_3$ | $C_2H_4Cl$ | —$CH_2CH_2$— | —$SO_2CH_3$ | —$COCH_3$ | Red. |
| 19 | 2-Cl-4-$NO_2$ | 3-$CH_3$ | $C_2H_4CONH_2$ | —$CH_2CH_2$— | —$SO_2CH_3$ | —$COCH_3$ | Red. |
| 20 | 2,6-di-Cl-4-$NO_2$ | None | —$CH_3$ | —$CH_2CH_2$— | —$SO_2CH_3$ | —$SO_2CH_3$ | Yellow. |
| 21 | 2,6-di-Cl-4-$NO_2$ | 3-$CH_3$ | —$C_2H_5$ | —$CH_2CH_2$— | —$SO_2CH_3$ | —$SO_2CH_3$ | Orange. |
| 22 | 2,6-di-Cl-4-$NO_2$ | 3-$CH_3$ | —$C_2H_5$ | —$CH_2CH_2$— | —$SO_2CH_3$ | —$COCH_3$ | Brown. |
| 23 | 2,6-di-Cl-4-$NO_2$ | 3-CN | —$C_2H_5$ | —$CH_2CH_2$— | —$SO_2CH_3$ | —$CONHC_2H_5$ | Do. |
| 24 | 2,6-di-Cl-4-$NO_2$ | 3-$OCH_3$ | —$C_2H_5$ | —$CH_2CH_2$— | —$SO_2CH_3$ | —$COCH_3$ | Do. |
| 25 | 2,6-di-Cl-4-$NO_2$ | 3-Cl | —$C_2H_5$ | —$CH_2CH_2$— | —$SO_2CH_3$ | —$COCH_3$ | Do. |
| 26 | 2,6-di-Cl-4-$NO_2$ | 3-$NHCOCH_3$ | —$C_2H_5$ | —$CH_2CH_2$— | —$SO_2CH_3$ | —$COCH_3$ | Red. |
| 27 | 2,6-di-Cl-4-$NO_2$ | 3-$CH_3$-6-$OCH_3$ | —$C_2H_5$ | —$CH_2CH_2$— | —$SO_2CH_3$ | —$COCH_3$ | Brown. |
| 28 | 2,4-bis-$SO_2CH_3$ | 2-$CH_3$ | H | —$CH_2CH_2$— | —$SO_2CH_3$ | —$SO_2CH_3$ | Orange. |
| 29 | 2,4-bis-$SO_2CH_3$ | 2-Cl | H | —$CH_2CH_2$— | —$SO_2CH_3$ | —$SO_2CH_3$ | Do |
| 30 | 2,4-bis-$SO_2CH_3$ | 3-$CH_3$ | $C_2H_5$ | —$CH_2CH_2CH_2$— | —$SO_2CH_3$ | —$SO_2CH_3$ | Do. |
| 31 | 2,4-bis-$SO_2CH_3$ | 3-$CH_3$ | $C_2H_4OCOCH_3$ | —$CH_2CH_2$— | —$SO_2CH_3$ | —$SO_2CH_3$ | Do. |
| 32 | 2,4-bis-$SO_2CH_3$ | 3-$CH_3$ | $CH_2CH(CH_3)CH_3$ | —$CH_2CH_2$— | —$SO_2CH_3$ | —$SO_2CH_3$ | Do. |
| 33 | 2,4-bis-$SO_2CH_3$ | 3-$CH_3$ | $C_2H_4SO_2CH_3$ | —$CH_2CH_2$— | —$SO_2CH_3$ | —$SO_2CH_3$ | Do. |
| 34 | 2,4-bis-$SO_2BH_3$ | 3-$CH_3$ | $C_2H_4N\diagdown Y$ | —$CH_2CH_2$— | —$SO_2CH_3$ | —$SO_2CH_3$ | Do. |
| 35 | 2-$SO_2CH_3$-4-$NO_2$ | 3-$CH_3$ | $C_2H_5$ | —$CH_2CH_2$— | —$SO_2CH_3$ | —$COCH_3$ | Red. |
| 36 | 2-$SO_2CH_3$-4-$NO_2$ | 3-$CH_3$ | —$C_2H_4CN$ | —$CH_2CH_2$— | —$SO_2CH_3$ | —$COCH_3$ | Do. |
| 37 | 4-CN | 3-$CH_3$ | —$C_2H_4Cl$ | —$CH_2CH_2$— | —$SO_2CH_3$ | —$COCH_3$ | Orange. |
| 38 | 4-CN | 3-$CH_3$ | —$C_2H_4OH$ | —$CH_2BH_2$— | $COCH_3$ | —$COCH_3$ | Do. |
| 39 | 4-$COCH_3$ | 3-$CH_3$ | —$C_2H_5$ | —$CH_2CH_2$— | $COCH_3$ | —$COCH_3$ | Do. |
| 40 | 4-$COCH_3$ | 3-$CH_3$ | —$C_2H_5$ | —$CH_2CH_2$— | —$SO_2CH_3$ | —$SO_2CH_3$ | Do. |
| 41 | 4-CHO | 3-$CH_3$ | —$C_2H_5$ | —$CH_2CH_2$— | —$SO_2CH_3$ | —$SO_2CH_3$ | Do. |
| 42 | 4-$CH_3$ | 3-$CH_3$ | —$C_2H_5$ | —$CH_2CH_2$— | —$SO_2CH_3$ | —$SO_2CH_3$ | Yellow. |
| 43 | 4-$SO_2CH_3$ | 3-$CH_3$ | —$C_2H_5$ | —$CH_2CH_2$— | —$SO_2CH_3$ | —$SO_2CH_3$ | Orange. |
| 44 | 4-$SO_2NH_2$ | 3-$CH_3$ | —$C_2H_5$ | —$CH_2CH_2$— | —$SO_2CH_3$ | —$SO_2CH_3$ | Do. |
| 45 | 2-$NO_2$ | 3-$CH_3$ | —$C_2H_5$ | —$CH_2CH_2$— | —$SO_2CH_3$ | —$SO_2CH_3$ | Do. |
| 46 | 4-$CF_3$ | 3-$CH_3$ | —$C_2H_5$ | —$CH_2CH_2$— | —$SO_2CH_3$ | —$SO_2CH_3$ | Do. |
| 47 | 4-$SO_2N(CH_3)_2$ | 3-$CH_3$ | —$C_2H_5$ | —$CH_2CH_2$— | —$SO_2CH_3$ | —$SO_2CH_3$ | Do. |

The azo compounds of the invention may be used for dyeing hydrophobic fibers such as linear polyester, cellulose ester, acrylic, polyamide, etc., fibers in the manner described in U.S. Patents 2,880,050, 2,757,064, 2,782,187 and 2,043,827. The following examples illustrate methods by which the azo compounds of the invention can be used to dye polyester textile materials.

0.1 gram of the dye is dissolved in the dye pot by warming in 5 cc. of ethylene glycol monomethyl ether. A 2% sodium-N-methyl-N-oleyl taurate and 0.5% sodium lignin sulfonate aqueous solution is added, with stirring, until a fine emulsion is obtained. Water is then slowly added to a total volume of 200 cc. 3 cc. of Dacronyx (a chlorinated benzene emulsion) are added and 10 grams of a textile fabric made of Kodel polyester fibers are entered. The fabric is worked 10 minutes without heat and then for 10 minutes at 80° C. The dyebath is then brought to the boil and held at the boil for one hour. Following this, the fabric is rinsed in warm water, then scoured in an aqueous 0.2% soap, 0.2% soda ash solution. After scouring, the fabric is rinsed with water and dried. Accordingly, since the azo compounds of the invention are water-insoluble, they can be applied from aqueous dispersions in the manner of the so-called "dispersed dyes." However, coloration can also be effected, under the trademarks "Kodel," "Dacron" and "Terylene," for example, in the form of filaments, yarn and fabric, for example, are illustrative of the polyester textile materials that can be dyed. Kodel polyester fibers are more particularly described in U.S. Patent 2,901,446. Dacron and Terylene polyester fibers are described, for example, in U.S. Patent 2,465,319. The polymeric linear polyester materials disclosed in U.S. Patents 2,945,010, 2,957,745 and 2,989,363, for example, can be dyed. The linear aromatic polyester materials specifically named have a melting point of at least 200° C.

Nylon, in fiber, yarn and fabric form is representative of polyamides which can be dyed with the azo compounds.

The invention has been described in considerable detail with particular reference to certain preferred embodiments thereof, but it will be understood that variations and modifications can be effected within the spirit and scope of the invetnion as described hereinabove, and as defined in the appended claims.

What we claim is:
1. An azo compound of the general formula

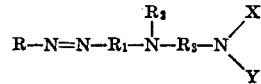

wherein:
R is a monocyclic aromatic radical,
$R_1$ is a monocyclic aromatic radical,
$R_2$ is hydrogen, a lower alkyl radical, or a monocyclic aromatic radical,
$R_3$ is a lower alkylene group and,
X and Y are the same or different and each is a lower alkanoyl radical, a benzoyl radical, a lower alkoxycarbonyl radical, and a carbamoyl radical, or a monocyclic aromatic sulfonyl radical.

2. An azo compound according to claim 1 wherein $R_2$ is a lower alkyl radical and $R_3$ is —$CH_2$—, —$CH_2CH_2$—, or —$CH_2CH(CH_3)$—.

3. An azo compound of the general formula

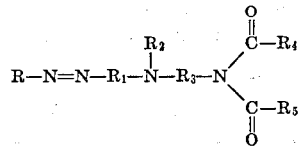

wherein:
R is a monocyclic aromatic radical,
$R_1$ is a monocyclic aromatic radical,
$R_2$ is a lower alkyl radical,
$R_3$ is a lower alkylene group,
$R_4$ and $R_5$ are lower alkyl, phenyl, lower alkoxy, or amino.

4. An azo compound of the general formula

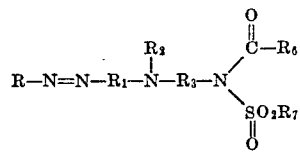

wherein:
R is a monocyclic aromatic radical,
$R_1$ is a monocyclic aromatic radical,
$R_2$ is a lower alkyl radical,
$R_3$ is a lower alkylene group,
$R_6$ is lower alkyl, phenyl, lower alkoxy, or amino, and
$R_7$ is lower alkyl or phenyl.

5. An azo compound of the general formula

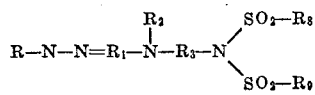

wherein:
R is a monocyclic aromatic radical,
$R_1$ is a monocyclic aromatic radical,
$R_2$ is a lower alkyl radical,
$R_3$ is a lower alkylene group,
$R_8$ and $R_9$ are lower alkyl or phenyl.

6. An azo compound of the formula:

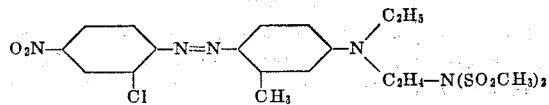

7. An azo compound of the formula:

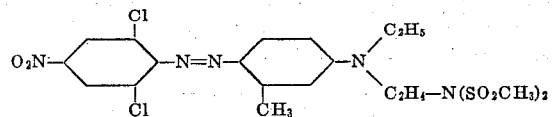

8. An azo compound of the formula:

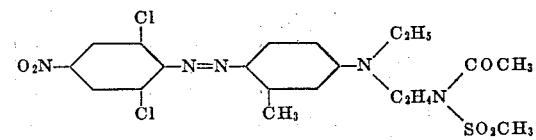

9. An azo compound of the formula:

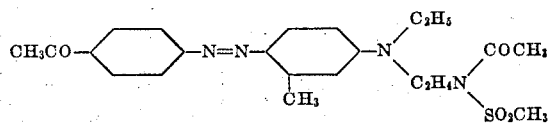

10. An azo compound of the formula:

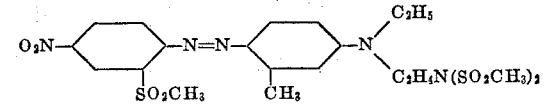

References Cited
UNITED STATES PATENTS
3,268,507   8/1966   Kruckenberg _____ 260—207

CHARLES B. PARKER, *Primary Examiner.*
D. PAPUGA, *Assistant Examiner.*